United States Patent
Gerhart et al.

(10) Patent No.: US 10,726,865 B2
(45) Date of Patent: Jul. 28, 2020

(54) ZONED BLOCK COMMAND TO STREAM COMMAND TRANSLATOR

(71) Applicant: Western Digital Technologies, Inc., San Jose, CA (US)

(72) Inventors: Darin Edward Gerhart, Oronoco, MN (US); Nicholas Edward Ortmeier, Rochester, MN (US); Cory Lappi, Rochester, MN (US); William Jared Walker, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 28 days.

(21) Appl. No.: 16/157,796

(22) Filed: Oct. 11, 2018

(65) Prior Publication Data
US 2020/0118585 A1   Apr. 16, 2020

(51) Int. Cl.
*G11B 5/09* (2006.01)
*G11B 5/012* (2006.01)

(52) U.S. Cl.
CPC ............ *G11B 5/09* (2013.01); *G11B 5/012* (2013.01)

(58) Field of Classification Search
CPC ................................. G11B 5/09; G11B 5/012
See application file for complete search history.

(56) References Cited

U.S. PATENT DOCUMENTS

| | | | |
|---|---|---|---|
| 8,904,091 B1 * | 12/2014 | Guda | G06F 3/061 711/103 |
| 2013/0219393 A1 * | 8/2013 | Myrah | G06F 9/45558 718/1 |
| 2017/0315913 A1 * | 11/2017 | Jibbe | G06F 12/0802 |

FOREIGN PATENT DOCUMENTS

JP           H1011531 A           1/1998

OTHER PUBLICATIONS

Apple Inc. et al.; "Universal Serial Bus Type-C Cable and Connector Specification", USB 3.0 Promotor Group, Release 1.3, Jul. 14, 2017 (241 pages).

* cited by examiner

*Primary Examiner* — Tasnima Matin
(74) *Attorney, Agent, or Firm* — Patterson & Sheridan, LLP; Steven Versteeg

(57) ABSTRACT

A method for performing an operation of a memory arrangement, comprising receiving a command at a layer of a computer system, determining if the command received is one of a first command type or a second command type, determining a type of command that is able to be received and is capable of operation of the memory arrangement, comparing the type of command capable of operation of the memory arrangement and the received command at the layer, and converting the command received at the layer to a command type capable of operation of the memory arrangement when the type of command received at the layer is different than type of command that is able to be received and is capable of operation of the memory arrangement.

20 Claims, 3 Drawing Sheets

| Virtual Zone Index | Zone Type | Zone Condition | NSWR Active | RWP Recommend | Start LBA | Length | Write Pointer LBA | Zone Statistics Counters |
|---|---|---|---|---|---|---|---|---|
| 0 | Conventional | Empty | False | False | 0 | Max LBA / Max Streams | 0 | Counters[] |
| 1 | Conventional | Empty | False | False | (Zone Index * (Max LBA / Max Streams)) - 1 | Max LBA / Max Streams | 0 | Counters[] |
| ... | ... | ... | ... | ... | ... | ... | ... | ... |
| Max Streams - 1 | Sequence Write Required | Empty | False | False | (Zone Index * (Max LBA / Max Streams)) - 1 | Max LBA / Max Streams | (Zone Index * (Max LBA / Max Streams)) - 1 | Counters[] |

FIG. 3

ZONED BLOCK COMMAND TO STREAM COMMAND TRANSLATOR

BACKGROUND OF THE DISCLOSURE

Field of the Disclosure

Embodiments of the present disclosure generally relate to translations for computer components. More specifically, aspects disclosed provide a zoned block command to stream command translator.

Description of the Related Art

A zoned block command ("ZBC") provides a mechanism for optimal usage of shingle magnetic recording ("SMR") hard drives. SMR technology is used in hard disk drives, however it is generally not implemented for solid state drives. Some host computer systems, have adopted support for ZBC to leverage and optimize use of SMR hard disk drives.

For optimal usage of solid state drives, stream command support is provided. Such stream command support provides a mechanism for host systems to separate write data (e.g. sequential vs random, hot vs. cold) to optimize solid state drive write amplification. Minimizing solid state drive write amplification has several benefits, including reducing wear and improving performance. These benefits for the solid state drive are achieved if write data is sorted into streams by the host system.

ZBC and stream commands share some common attributes. ZBC and stream commands have similar management commands, for example, open, close, and get zone/stream status commands. Individual zones and streams are intended to group similar write data together. Solid state drives may utilize zoned block commands for write data separation purposes.

Generally, host systems strive for optimal utilization of all end device types. Manufacturers may then differentiate offerings based on installed end devices. Differing end devices may then differentiate the respective host systems based upon performance, capacity or other performance attributes while leveraging costs across a common system design. Both ZBC and stream command support would enable host systems to ensure optimal use of both SMR hard disk drives and solid state drives.

There is a need to provide a host system with both ZBC and stream command support to enable a user flexible system.

There is a further need to provide a host system with both ZBC and stream command support that is economical.

SUMMARY OF THE DISCLOSURE

The present disclosure generally relates to methods and apparatus to allow a layer of a computer or memory arrangement system to enable translation of commands such that different types of memory arrangement systems may be used interchangeably with computer host systems.

In a first embodiment, a method for performing an operation of a memory arrangement is disclosed comprising receiving a command at a layer of a computer system, determining if the command received is one of a first command type or a second command type, determining a type of command that is able to be received and is capable of operation in the memory arrangement, comparing the type of command capable of operation in the memory arrangement and the received command at the layer of the computer system; and converting the command received at the layer to a command type capable of operation of the memory arrangement when the type of command received at the layer is different than type of command that is able to be received and is capable of operation in the memory arrangement.

In another example embodiment, a method of creating an optimal interface for a memory arrangement is disclosed comprising connecting the memory arrangement to a host system, querying the memory arrangement as to a type of command that will be accepted and operated upon by the memory arrangement and preparing an interface between the host system and memory arrangement such that commands provided by the host system will be accepted and operated upon by the memory arrangement.

In another embodiment, a method for performing an operation of a memory arrangement is disclosed comprising receiving a command at a layer of a computer system, determining if the command at the layer of the computer system corresponds to a virtual zoned block device and independently processing the command at the layer of the computer system when the command at the layer of the computer system corresponds to the virtual zoned block device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3 is a virtual zone table and associated values for end devices that support streams.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figures 1A, 1B, 1C, 1D:
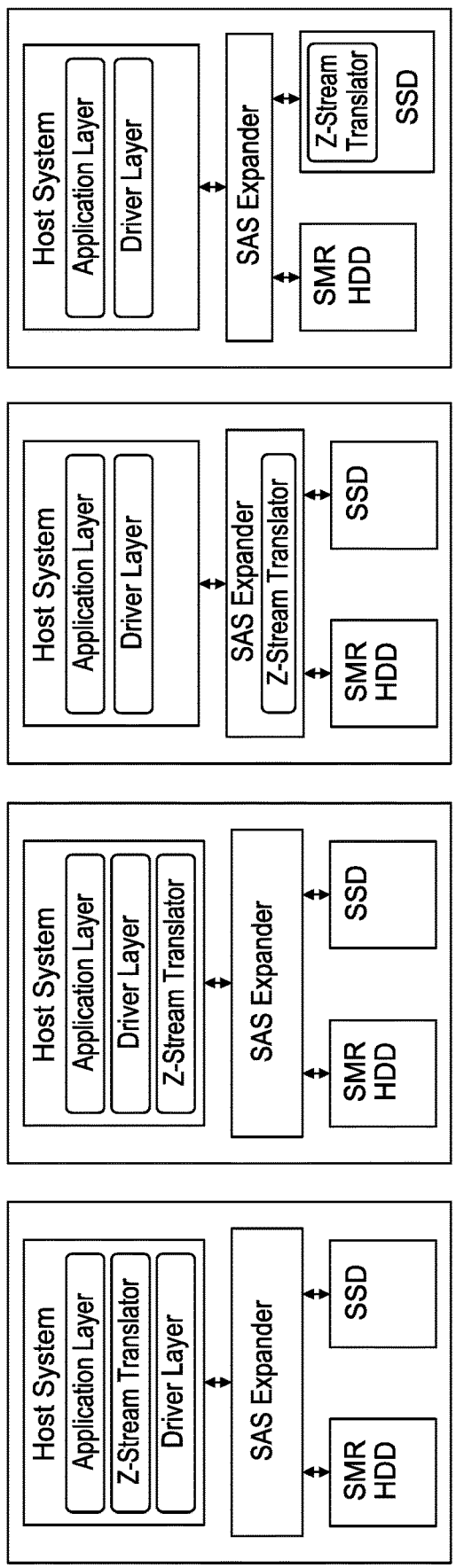
FIG. 1A is an organizational plan view of a Z-Stream translator installed in a host system.
FIG. 1B is an organizational plan view of a Z-Stream translator installed in a host system under a driver layer.
FIG. 1C is an organizational plan view of a Z-Stream translator installed in a SAS Expander.
FIG. 1D is an organizational plan view of a Z-Stream translator installed in a solid state drive.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the disclosure relate to providing a ZBC to stream translator to enable a host system to translate requests to the optimal command set for the connected device. In embodiments disclosed, the ZBC to stream translator converts native ZBC commands from an upper software layer to commands optimal for a connected device type and sends those commands to a lower software layer. In embodiments, native ZBC is used for communication to SMR hard disk drive end devices. The ZBC to stream translator translates ZBC commands to Stream commands for communicating with solid state drive end devices.

In particular, zoned block devices are present in host systems with a static zone layout for the device. The layout has a specific protocol for zone access that is enforced by the device. Two types of zoned block devices are generally provided. A host aware zoned block device may be provided that supports sequential write preferred zones. In another embodiment, a host managed zoned block device is provided that supports sequential write required zones. In either embodiment of zoned block devices, a variety of zoned block devices attributes may be provided such as the zone type (conventional, sequential write preferred, sequential write required), zone state, write pointer and zone access statistics.

For stream devices, stream resources may be presented to a host system, wherein the stream resources may be concurrently used and not restricted to a defined logical based address layout. Minimal protocol enforcement may be provided. Moreover, minimal stream attributes maintenance will be needed to be provided.

A list of functional aspects for both ZBC devices as well as stream devices is provided below in Table 1.

TABLE 1

| Functional Aspect | ZBC Devices (e.g. SMR HDD) | Stream Devices (e.g. SSD) |
|---|---|---|
| Host Detection | Peripheral Device Type in Standard Inquiry Page and ZONED field in Block Device Characteristics VPD Page | Maximum Number of Streams in Block Limits Extension VPD Page |
| Management | Open Zone Command, Close Zone Command, Finish Zone Command, Report Zones Command and Reset Write Pointer Command | Stream Control Command to Open/Close Streams and Get Stream Status to determine Stream State |
| Parameters | Optimal Number of Open Sequential Write Preferred Zones, Optimal Number of Non-sequentially Written Sequential Write Preferred Zones, Maximum Number of Open Sequential Write Required Zones, Zoned Block Device Statistics Log Page containing various zone counters & attributes | Maximum Number of Streams, Optimal Stream Write Size, Stream Granularity Size |
| Media Access | Normal R/W Commands to LBA-based Zones | Write Stream Commands to Stream ID designated Streams |

In embodiments, the ZBC to Stream translator may be placed, as provided in FIG. 1A, in the host system between an application layer and driver layer. In an alternative embodiment, provided in FIG. 1B, the ZBC to Stream translator is placed within the host system below the driver layer and is connected to the SAS expander. In an alternative embodiment, the ZBC to Stream translator may be incorporated into a SAS expander, as illustrated in FIG. 1C. In another example embodiment, as provided in FIG. 1D, the ZBC to Stream translator may be incorporated into a solid state device.

In comparison, the ZBC and Stream commands offer similar functionality, however they do so through different interfaces. Stream commands facilitate more dynamic and flexible write data sorting. ZBC commands, however, are more static and restrictive in use. Another difference between the ZBC and Stream commands is that the commands are mutually exclusive. As an example, ZBC devices must adhere to ZBC policies, while Stream devices must adhere to stream policies.

In embodiments of the ZBC to Stream translator, the translator provides several high-level functions. The ZBC to Stream translator detects the availability of end device types that would benefit from stream command usage. As a non-limiting example, a solid state drive would benefit from such stream command usage. The ZBC to Stream translator may create a virtual ZBC configuration based on end device capabilities and present that to a host command management layer. ZBC commands may be intercepted from the host command management layer and converted to stream commands. The ZBC to Stream translator may perform zone state management and write pointer management for the virtual zones that are translated for the end device.

Figure 2:
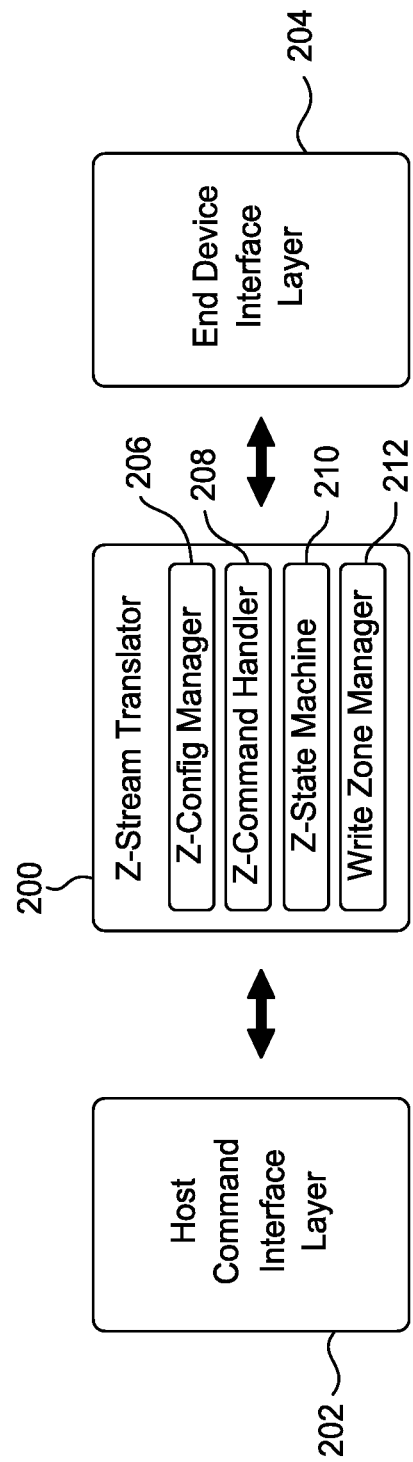
FIG. 2 is a diagram of components of the Z-Stream translator as well as their relationship between a host command interface layer and an end device interface layer.

Referring to FIG. 2, a diagram of components of the ZBC to Stream translator 200 are provided as well as their relationship between a host command interface layer 202 and an end device interface layer 204. The ZBC to Stream translator 200 is provided with a Z-config manager 206, a Z-command handler 208, a Z-state machine 210 and a write zone manager 212. The Z-config manager 206 is responsible for detecting device stream capabilities and presenting appropriate virtual zone support to an upper layer. The Z-config manager 206 is also responsible for managing the zoned block device characteristics VPD page. The Z-command handler 208 is responsible for translating ZBC commands into Stream commands to process at lower layer levels. The Z-state machine 210 manages various virtual zone states (empty, full, closed, opened) and maintains log zone statistics based on the host logical based address accesses. The write zone manager 212 manages virtual write zone pointers and protocol rules for sequential write required and sequential write preferred zones.

Attributes and functional responsibilities for the Z-config manager 206 are varied. The Z-config manager 206 detects capabilities of lower level devices (e.g. device support for ZBC, device support for stream commands). The Z-config manager 206 maintains a map of lower level devices and their capabilities. Furthermore, the Z-config manager 206 may create virtual zone tables for end devices that do not support ZBC. The Z-config manager 206 may also be configured such that virtual zoned block devices are configured as host aware zoned block devices or host managed zoned block devices based on user configuration input. The Z-config manager 206 may also be provided to present device capabilities to upper level software (including Virtual Zone Capabilities).

The Z-config manager 206 has user defined input parameters. One parameter is defined as a virtual zoned block device type. The virtual zoned block device type specifies the type of virtual zoned block device that the Z-config manager 206 should create. Typical values may be defined such that 0=a host aware zoned block device and 1=a host managed zoned block device. Another user defined input parameter is a virtual write zone count. The virtual write zone count specifies a number of write zones that the virtual zoned device should include. For the purpose of definition, at a minimum, one write zone is provided with an upper limit up to the maximum number of streams. Input parameter control may be provided through a mode page if the ZBC to Stream translator is implemented at the device level or through the device manager if the Z-stream translator is implemented at a higher layer.

Implementation details of the Z-config manager 206 provide that following device enumeration, the Z-Stream translator 200 checks vital product data ("VPD") of the end device to determine if ZBC is natively supported or if stream commands are natively supported. In one non-limiting embodiment, the ZBC type may be determined by a combination of the peripheral device type in standard inquiry data and zoned field in the block device characteristics VPD page. Stream command support may be determined by the maximum number of streams in the block limits VPD page. As a non-limiting example, a value of 0 indicates that stream commands are not supported.

If a ZBC compliant device is detected or an end device that does not support ZBC or Streams is detected, the Z-Stream translator 200 enters "pass-through mode" where ZBC commands are simply passed directly to the device. If a stream compliant device is detected, the Z-config manager may maintain and intercept (or override) the inquiry data for the peripheral device type and the zoned field to reflect the user specified virtual zoned block device type.

The Z-config manager 206 configures a virtual zone table for end devices that support streams but do not support ZBC. Using a maximum number of streams from the block limits extension VPD of the stream command compliant end device, the Z-config manager 206 arranges a virtual zone table containing an equivalent number of virtual zones evenly distributed over the device capacity space.

In one example embodiment illustrated in FIG. 3, a virtual zone table may consist of several entries. A zone type entry is provided that reflects the type of zone (conventional=1, Sequential Write Required=2, Sequential Write Preferred=3). The type of write zones supported by the virtual zone device is specified by the virtual zoned block device type input parameter and the number of write zones is specified by the virtual write zone count input parameter. This field is configured during device detection by the Z-config manager 206.

A zone condition entry is also provided in the virtual zone table example from FIG. 3. The zone condition indicates the current zone state. This field is initialized as empty by the Z-config manager 206 and maintained by the Z-state machine 210.

A non-sequential writer resources (NSWR) Action entry is provided in the virtual zone table example from FIG. 3. The NSWR is provided to indicate whether non-sequential write resources are active for this zone. This field is maintained by the write zone manager 212.

A reset write pointer (RWP) recommend entity is provided in the virtual zone table example from FIG. 3. The RWP entity indicates whether the write pointer reset is recommended for this specific zone. This field is maintained by the write zone manager 212.

A start LBA (logical based address) entity is further provided in the virtual zone table example illustrated in FIG. 3. The start LBA entity specifies the starting LBA for this virtual zone. This value is configured during device detection by the Z-config manager 206.

A length entry is also provided in the virtual zone table example from FIG. 3. The length entry specifies the zone length for this virtual zone. The value is configured during device detection by the Z-config manager 206.

The virtual zone table has a write pointer LBA entity as shown in FIG. 3. The write pointer LBA specifies the current location of the write pointer for this virtual zone. This field is maintained by the write zone manager 212.

The virtual zone table also provides zone statistics counters as illustrated in FIG. 3. The zone statistics counters specify the zone statistics for this virtual zone which are tracked for reporting purposes in the zoned block device statistics log page. These counters are maintained by the Z-state machine 210.

The Z-command handler 208 is provided for the Z-stream translator 200. The Z-command handler component 208 is responsible for several functions. The Z-command handler 208 intercepts host initiated ZBC commands that are issued to Stream compliant devices. The Z-command handler 208 also translates ZBC commands into applicable Stream commands and issues them to the Stream compliant device (e.g. Open Zone, Close Zone, Write). The Z-command handler 208 also processes ZBC commands that are applicable to virtual ZBC drives (e.g. report zones, reset write pointer, finish zone). In some embodiments, the Z-command handler 208 performs special handling and overriding data for commands that have zone content (e.g. Format, Sanitize, Inquiry, Read Capacity). The Z-command handler 208 is also responsible for returning a response to a host initiated ZBC command.

The Z-command handler 208 may be implemented to use Z-config manager 206 component information, and the Z-command handler 208 inspects command frames destined for Stream compliant devices. The Z-command handler 208 converts any applicable ZBC command into a stream command or stream commands. Open zone and close zone commands may be translated into Stream control commands. Write commands may be issued to specific zones and may be translated into write stream commands to the corresponding Stream ID. The Z-command handler 208 may issue a Stream command to the Stream compliant device, facilitate the associated data transfer and wait for a response. The Z-command handler 208 may forward the stream compliant device response to the upper level host system.

The Z-command handler 208 may directly process ZBC commands that are applicable to the virtual ZBC drive. The Z-command handler 208 performs a "report zones" command by returning the virtual zone table created by the Z-config manager 206 component. The Z-command handler 208 performs a finish zone command by requesting virtual zone state transition from the Z-state machine 210 component. In some embodiments, the Z-command handler 208 performs reset write pointer commands by requesting virtual zone state transitions from the Z-state machine 210 component and by resetting the virtual write pointer maintained by the write zone manager 212 component and performing an inherent trim of affected LBAs in the virtual zone. The Z-command handler 208 generates and returns the command response to the host.

The Z-command handler 208 may inspect other device commands that have an effect on the virtual zoned device. The Z-command handler 208 ensures format and sanitize commands are issued to Stream compliant devices which may also result in associated updates to the virtual zone condition state table and virtual write pointer in the Z-state machine 210 component and the write zone manager 212 component respectively. The Z-command handler 208 overrides the peripheral device type in standard inquiry data and zoned field in block device characteristics VPD page as defined as the Z-config manager 208 component. The Z-command handler 208 processes inquiry requests to the zoned block device characteristics page to reflect the configuration of the virtual zoned device. The Z-command handler 208 may also update data returned for read capacity based on the Read Capacity (RC) basis field.

The Z-state machine 210, as provided in FIG. 2, is provided to perform several functions. First, the Z state machine 210 is provided to maintain non-volatile virtual zone condition state machines for all virtual zones for lower level Stream compliant devices. The Z-state machine 210 is also provided for supporting virtual zone condition state machine updates as requested by other Z-stream components. The Z-state machine 210 may also maintain log zone statistics for each virtual zone.

The Z-state machine 210 has several implementation details. The Z-state machine 210 may maintain states for the virtual zone condition states machine for all zones in all virtual zoned devices. A list of states includes empty, implicit open, explicit open, closed, full, offline and read only.

In the empty state, no valid data is in this zone and the virtual write pointer is set to the first LBA in the zone. For the Implicit open state, the write zone is open to receiving write data via implicit open from the write command to LBAs in that zone. For the explicit open state, the write zone is open to receiving write data via the explicit open zone command. For the closed command, the write zone is no longer open to receiving additional write data. For the full state, the write zone is full and may no longer be opened to receive additional write data. For the offline state, the lower level stream compliant device has entered a faulted condition and is no longer capable of receiving write data.

The Z-state machine 210 may support state transition requests from other Z-stream translator components. The Z-command handler 208 component requests virtual zone condition state machine state transitions based on host commands. The write zone manager 212 component requests virtual zone condition state machine state transitions based on read/write accesses to zones. The Z-state machine 210 also enforces ZBC protocol for the virtual zone condition state machine by rejecting invalid state transition requests.

The Z-state machine 210 may also maintain and log zone statistics for each virtual zone. An example of such statistics is maintaining all zone counters necessary to support zoned block device log pages. Additionally, the Z-state machine 210 may use zone access information provided by the write zone manager 212 component to update zone statistics as zone events occur. The Z-state machine 210 may also maintain counter statistics for virtual zone condition state machine transitions as they occur.

As provided in FIG. 2, a write zone manager 212 is further provided. The write zone manager 212 provides for monitoring read and write accesses to each zone and enforcing zone protocol access rules. Additionally, the write zone manager 212 maintains virtual write pointers for all virtual write zones for any lower level stream compliant devices.

The write zone manager 212 performs LBA lookups for host commands to determine which virtual zone is being accessed. The write zone manager 212 enforces protocol rules based on the zone type being accessed. The write zone manager 212 also interfaces with the Z-state machine 210 component to see if the zone state should allow or reject host access requests. The write zone manager 212 has other functions, such as enforcing sequential access rules for sequential write required zones and enforcing command alignment rules within zone boundaries. The write zone manager 212 may also be configured to request state transitions from the Z-state machine 210 component if a command access results in a virtual zone state transition (e.g. implicit open, full).

The write zone manger 212 may also update virtual write pointers based on host command access for virtual write zones. The write zone manager 212 may increment virtual write pointers based on host write command accesses to sequential write required zones or sequential write preferred zones. In some embodiments, the write zone manager 212 is configured to invalidate the virtual write pointers when a host write command results in a virtual zone state transition to the full state.

FIG. 3 is a virtual zone table example that includes associated values for end devices that support streams. The virtual zone table provides for a Zone Type. The zone type reflects the type of zone (Conventional=1, Sequential Write Required=2, Sequential Write Preferred=3). The type of write zones supported by the Virtual Zone Device is specified by the Virtual Zoned Block Device Type input parameter and the number of Write Zones is specified by the Virtual Write Zone Count input parameter. This field is configured during device detection by the Z-Config Manager. The value of zone condition indicates the current zone state. This field is initialized to Empty by Z-Config Manager and maintained by the Z-State machine. The value of NSWR Action indicates whether Non-Sequential Write Resources are active for this zone. This field is maintained by the write zone manager. The value of RWP Recommend indicates whether write pointer reset is recommended for this zone.

This field is maintained by the write zone manager. The value of Start LBA specifies the start LBA for this virtual zone. This value is configured during device detection by the Z-Config Manager. The value of length specifies the Zone Length for this Virtual Zone. This is configured during device detection by the Z-Config Manager. The value of Write Pointer LBA specifies the current location of the Write Pointer for this Virtual Zone. This field is maintained by the Write Zone Manager.

The values of zone statistics counters specifies the zone statistics for the virtual zone which are tracked for reporting purposes in the zoned block device Statistics Log Page 0x14, Subpage 0x01. These counters are maintained by the Z-State Machine.

In the embodiments provided, devices are allowed to operate in a native functionality that is optimal for the device. The device does not need to provide or allocate resources for redundant methods to provide similar functionality. The implementation allows for automatically configured systems that exhibit optimal usage based on device capabilities and host system capabilities. The Z-Stream translator is modular in design and can be implemented at different layers within the system design. This provides system design flexibility to maximize compatibility between existing host systems and end devices. As an example, there is an ability to install a SSD with a stream command support into host systems with ZBC support and realize stream benefits.

An additional advantage of the embodiments provided include device testing capabilities. Less testing is required to be run by equipment manufacturers as the system is less prone to errors. Resolution of the issues that are present is quicker as such issues are minimized. When the Z-stream translator 200 is implemented at a host system level, lower qualification costs are expended. System engineers need only to complete a single qualification of a device operating in a native functional mode rather than an expanded qualification of a device being used in two different modes.

In the embodiments provided, a layer, such as an abstraction layer that is either hardware or firmware, can automatically configure an optimal interface between a host computer system that supports ZBC and devices that support Stream commands. Such embodiments provide a wider variety of configurations and usage capabilities compared to conventional apparatus. An ability of the layer to detect stream command compliant devices is also provided and virtual block devices (e.g. ZBC compliant devices) are presented to host systems based on stream capabilities of the end device.

In embodiments described above, a user is provided a capability to configure a layer to present a stream compliant end devices as either a host aware zoned block device or a host managed zoned block device. The layer may translate ZBC commands into Stream commands.

In the above embodiments, write commands may be detected by the layer when those write commands will occur to a virtual zone in a virtual zoned block device and translate those write commands into write stream commands to corresponding stream IDs and issue the write stream commands to stream capable devices. The layer may intercept write and other commands that only apply to virtual block devices, for example, and independently process those commands.

In other embodiments, the layer may intercept data and override certain fields related to commands that have some data applicable to zoned block devices and replace that data with information that represents a virtual zoned block device.

Embodiments also provide for the layer (translator) to create and maintain a virtual zone table that represents a stream compliant end device. The virtual zone table may then be used at other times for processing, thus allowing for more efficient processing.

In a first embodiment, a method for performing an operation of a memory arrangement is disclosed comprising receiving a command at a layer of a computer system, determining if the command received is one of a first command type or a second command type, determining a type of command that is able to be received and is capable of operation in the memory arrangement, comparing the type of command capable of operation in the memory arrangement and the received command at the layer of the computer system; and converting the command received at the layer to a command type capable of operation of the memory arrangement when the type of command received at the layer is different than type of command that is able to be received and is capable of operation in the memory arrangement.

In another example embodiment, the method may be performed wherein the layer of the computer system is within a host system.

In another example embodiment, the method may be performed wherein the layer of the computer system is within an SAS expander.

In another example embodiment, the method may be performed wherein the layer of the computer system is in the memory arrangement.

In another example embodiment, the method may be performed wherein the first type is a stream type command.

In another example embodiment, the method may be performed wherein the second type is a zoned block command.

In another example embodiment, the method may be performed wherein the memory arrangement is a solid state drive.

In another example embodiment, the method may further comprise transmitting the command type capable of operation for the memory arrangement to the memory arrangement.

In another example embodiment, the method may further comprise receiving the command type capable of operation for the memory arrangement at the memory arrangement.

In another example embodiment, a method of creating an optimal interface for a memory arrangement is disclosed comprising connecting the memory arrangement to a host system, querying the memory arrangement as to a type of command that will be accepted and operated upon by the memory arrangement and preparing an interface between the host system and memory arrangement such that commands provided by the host system will be accepted and operated upon by the memory arrangement.

In a further example embodiment, the method may be configured wherein the interface between the host system and the memory arrangement provides at least one of data and commands from the memory such that the host system will be capable of accepting the data and acting upon the commands from the memory.

In a still further example embodiment, the method may be accomplished wherein the querying the memory arrangement as to the type of command that will be accepted and operated upon by the memory arrangement detects one of a stream complaint device and a zoned block compliant device.

In another example embodiment, the method may be accomplished wherein the stream compliant device is a solid state drive.

In a still further embodiment, the method may be performed wherein the zoned block compliant device is a hard disk drive.

In another embodiment, the method may be performed wherein an abstraction layer presents the interface of the memory arrangement to the host system as a device compliant for memory storage with the host system.

In another embodiment, a method for performing an operation of a memory arrangement is disclosed comprising receiving a command at a layer of a computer system, determining if the command at the layer of the computer system corresponds to a virtual zoned block device and independently processing the command at the layer of the computer system when the command at the layer of the computer system corresponds to the virtual zoned block device.

In another example embodiment, the method may be accomplished wherein the independently processing the command occurs in a component of a memory arrangement.

In another example embodiment, the method may be performed wherein the component is a Z stream translator.

In another example embodiment, the method may be performed wherein the memory arrangement is a solid state drive.

In another example embodiment, the method may further comprise transmitting the command to the memory arrangement.

While the foregoing is directed to embodiments of the present disclosure, other and further embodiments of the disclosure may be devised without departing from the basic scope thereof, and the scope thereof is determined by the claims that follow.

What is claimed is:

1. A method for performing an operation of a memory arrangement, comprising:
    receiving a command at a layer of a computer system;
    determining if the command received is one of a first command type or a second command type;
    determining a type of command that is able to be received and is capable of operation in the memory arrangement;
    comparing the type of command capable of operation in the memory arrangement and the received command at the layer of the computer system; and
    converting the command received at the layer to a command type capable of operation of the memory arrangement when the type of command received at the layer is different than type of command that is able to be received and is capable of operation in the memory arrangement, wherein the converting comprises converting a zone block command to a stream command.

2. The method according to claim 1, wherein the layer of the computer system is within a host system.

3. The method according to claim 1, wherein the layer of the computer system is within an SAS expander.

4. The method according to claim 1, wherein the layer of the computer system is in the memory arrangement.

5. The method according to claim 1, wherein the first type is a stream type command.

6. The method according to claim 1, wherein the first type is a zoned block command.

7. The method according to claim 1, wherein the memory arrangement is a solid state drive.

8. The method according to claim 1, further comprising:
    transmitting the command type capable of operation for the memory arrangement to the memory arrangement.

9. The method according to claim 1, further comprising:
    receiving the command type capable of operation for the memory arrangement at the memory arrangement.

10. A method of creating an optimal interface for a memory arrangement, comprising:
    connecting the memory arrangement to a host system;
    querying the memory arrangement as to a type of command that will be accepted and operated upon by the memory arrangement; and
    preparing an interface between the host system and memory arrangement such that commands provided by the host system will be accepted and operated upon by the memory arrangement, wherein the accepted and operated comprises converting a zone block command to a stream command.

11. The method of claim 10, wherein the interface between the host system and the memory arrangement provides at least one of data and commands from the memory such that the host system will be capable of accepting the data and acting upon the commands from the memory.

12. The method according to claim 10, wherein the querying the memory arrangement as to the type of command that will be accepted and operated upon by the memory arrangement detects one of a stream compliant device and a zoned block compliant device.

13. The method according to claim 12, wherein the stream compliant device is a solid state drive.

14. The method according to claim 12, wherein the zoned block compliant device is a hard disk drive.

15. The method according to claim 12, wherein an abstraction layer presents the interface of the memory arrangement to the host system as a device compliant for memory storage with the host system.

16. A method for performing an operation of a memory arrangement, comprising:
    receiving a command at a layer of a computer system;
    determining if the command at the layer of the computer system corresponds to a virtual zoned block device; and
    independently processing the command at the layer of the computer system when the command at the layer of the computer system corresponds to the virtual zoned block device, wherein the processing comprises converting a zone block command to a stream command.

17. The method according to claim 16, wherein the independently processing the command occurs in a component of a memory arrangement.

18. The method according to claim 17, wherein the component is a Z stream translator.

19. The method according to claim 16, wherein the memory arrangement is a solid state drive.

20. The method according to claim 16, further comprising:
    transmitting the command to the memory arrangement.

* * * * *